United States Patent
Lee et al.

(10) Patent No.: US 9,616,921 B2
(45) Date of Patent: Apr. 11, 2017

(54) METHOD OF ADJUSTING FRICTION OF MOTOR DRIVEN POWER STEERING AND THE APPARATUS FOR PERFORMING THE SAME

(71) Applicants: Hyundai Motor Company, Seoul (KR); Hyundai Mobis Co., Ltd., Seoul (KR)

(72) Inventors: Kyung Bok Lee, Hwaseong-si (KR); Nam Young Kim, Gunpo-si (KR); Do Young Kim, Gyeonggi-do (KR)

(73) Assignees: Hyundai Motor Company, Seoul (KR); Hyundai Mobis Co., Ltd., Seoul (KR)

( * ) Notice: Subject to any disclaimer, the term of this patent is extended or adjusted under 35 U.S.C. 154(b) by 117 days.

(21) Appl. No.: 14/543,408

(22) Filed: Nov. 17, 2014

(65) Prior Publication Data

US 2015/0183457 A1    Jul. 2, 2015

(30) Foreign Application Priority Data

Dec. 27, 2013 (KR) .................. 10-2013-0165247

(51) Int. Cl.
*B62D 6/00* (2006.01)

(52) U.S. Cl.
CPC .............. *B62D 6/006* (2013.01); *B62D 6/008* (2013.01)

(58) Field of Classification Search
None
See application file for complete search history.

(56) References Cited

U.S. PATENT DOCUMENTS

| | | | |
|---|---|---|---|
| 2007/0227806 A1* | 10/2007 | Wei ..................... | B62D 5/0472 180/446 |
| 2011/0257847 A1* | 10/2011 | Uematsu ................ | B60T 8/172 701/48 |
| 2012/0199414 A1* | 8/2012 | Shimizu ............... | B62D 5/0463 180/446 |
| 2013/0226405 A1* | 8/2013 | Koumura .............. | B60G 17/08 701/38 |
| 2014/0297119 A1* | 10/2014 | Giovanardi ......... | F15B 13/0444 701/38 |

(Continued)

FOREIGN PATENT DOCUMENTS

KR       1998-0039087       8/1998
KR       10-2009-0061182 A   6/2009

(Continued)

OTHER PUBLICATIONS

Author Unknown, "Control Method of Steering Force of MDPS Interlocking With Frictional Force of Driving Road Depending on Weather Conditions" (2010).

*Primary Examiner* — Jelani Smith
(74) *Attorney, Agent, or Firm* — Morgan, Lewis & Bockius LLP

(57) ABSTRACT

A method of adjusting friction of an MDPS unit may include detecting road surface conditions of a road on which a vehicle travels; classifying the road on which the vehicle travels into a normal road, a low frictional road, a road having a first uneven road surface, and a road having a second uneven road surface; and reducing friction of the MDPS unit of the vehicle when the road on which the vehicle travels is determined as the road having the first uneven road surface.

16 Claims, 18 Drawing Sheets

(56) References Cited

U.S. PATENT DOCUMENTS

2015/0088380 A1\* 3/2015 Gabor .................. B60L 7/10
701/41

FOREIGN PATENT DOCUMENTS

| KR | 10-2013-0056062 A | 5/2013 |
| KR | 10-2013-0056426 A | 5/2013 |
| KR | 10-2013-0066835 A | 6/2013 |

\* cited by examiner

| OPERATING CONDITIONS | DETERMINATION | ARS | STEERING FEELING | PRIORITY | CONCEPT FOR DESIGN | USED SIGNAL |
|---|---|---|---|---|---|---|
| UNEVEN ROAD SURFACE | HIGH UNEVENESS | 45% | Sport | 3 | -HIGH FRICTION NEEDS FOR ROAD SURFACE KICKBACK | WHEEL SPEED, VEHICLE SPEED |
| | LOW UNEVENESS | 30% | Sport | 4 | -HIGH STEERING FEELING NEEDS FOR IMPROVED DRIVING STABILITY | |
| LOW FRICTIONAL ROAD SURFACE | LOW ROAD SURFACE FRICTION | 45% | Sport | 7 | -LOW FRICTION NEEDS FOR REDUCTION OF FRICTION FEEL AND IMPROVEMD RESTORATION -HIGH STEERING FEELING NEEDS FOR IMPROVED DRIVING STABILITY | COLUMN TORQUE, MDPS OUTPUT, STEERING ANGLE, STEERING ANGULAR VELOCITY, VEHICLE SPEED |
| | WHEN SLIPPING | 30% | Sport | 5 | -HIGH FRICTION & HEAVY STEERING FEELING NEED TO PREVENT DRIVER'S ERRONEOUS STEERING | VSM OPERATION SIGNAL |
| SUDDEN ACCELERATION /DECELERATION | SUDDEN ACCELERATION (FOCUSED TORQUE STEER) | 45% | Sport | 6 | -HIGH FRICTION NEEDS TO PREVENT FOCUSING OF TORQUE/BRAKING -HEAVY STEERING FEELING NEEDS FOR THE IMPROVED SAFETY DURING FOCUSING | VEHICLE SPEED |
| | SUDDEN ACCELERATION (FOCUSED BRAKING STEER) | | | | | |
| MDPS FAULT | B,C FAULT | 15% | Manual | 1 | -LOW FRICTION & HEAVY STEERING FEELING NEED FOR LIGHT STEERING DURING MANUAL OPERATING OF MDPS | MDPS FAULT CODE |
| | A FAULT | 45% | Sport | 2 | -LOW FRICTION & HEAVY STEERING FEELING NEED TO RECOGNIZE MDPS ALARM LAMP | |

FIG. 6

METHOD OF ADJUSTING FRICTION OF MOTOR DRIVEN POWER STEERING AND THE APPARATUS FOR PERFORMING THE SAME

CROSS-REFERENCE TO RELATED APPLICATION

The present application claims priority to Korean Patent Application No. 10-2013-0165247 filed on Dec. 27, 2013, the entire contents of which is incorporated herein for all purposes by this reference.

BACKGROUND

Field of the Invention

The present disclosure relates to a method of adjusting friction of a motor driven power steering and an apparatus for performing the same, and more particularly to a motor driven power steering unit for providing optimal steering feeling suitable for road surface conditions and acceleration or deceleration.

Description of Related Art

Recently, many vehicles are provided with a motor driven power steering (MDPS) system as a steering unit. The MDPS system is advantageous in that it can improve fuel efficiency than the existing hydraulic power steering system and reduce working process due to the reduced number of parts provided therein.

In the existing MDPS system, however, steering feeling is already reflected to an existing same tuning map, and thus frictional feeling of the steering system cannot be changed even when there is a change in road surface conditions. This brings a phenomenon in which a steering wheel becomes light on a road surface with low friction coefficient such as a wet road surface and a snowy road surface. Since friction of the steering system is relatively low on an unpaved road, the steering wheel can be easily turned right and left, thereby making it difficult to transmit the optimal steering feeling to a driver.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a motor driven power steering (MDPS) apparatus for detecting road surface conditions to optimize a frictional feeling and a steering feeling thereof.

In an aspect of the present disclosure, a method of adjusting friction of a motor driven power steering (MDPS) unit may include detecting road surface conditions of a road on which a vehicle travels, classifying the road on which the vehicle travels into a normal road, a low frictional road, a road having a first uneven road surface, and a road having a second uneven road surface, and reducing the friction of the MDPS unit of the vehicle when the road on which the vehicle travels is determined as the road having the first uneven road surface.

The method, In the classification of the road on which the vehicle travels into classifying the road on which the vehicle travels is classified into the normal road, the low frictional road, the road having the first uneven road surface, and the road having the second uneven road surface, may further include inputting a column torque of the vehicle, an output from the MDPS unit, a steering angle, a steering angular velocity, a vehicle speed, a wheel speed, a vehicle stability management (VSM) operating signal, determining the road as the first uneven road surface when a difference between wheel speeds of right and left tires of the vehicle is greater than a first preset uneven reference and less than a second preset uneven reference, determining the road as the low frictional road when a value obtained by dividing the column torque by the preset torque value is less than 1 (one), and determining the road as the normal road other else.

The method, in the increasing friction of the MDPS unit of the vehicle when the road on which the vehicle travels is determined as the low frictional road or the road having the uneven road surface when classifying the road on which the vehicle travels into the normal road, the low frictional road, the road having the first uneven road surface, and the road having the second uneven road surface, may further include adjusting a supporting force of an active roll stabilizer (ARS) to a third preset supporting force when the road on which the vehicle travels is classified into the low frictional road without a VSM operating signal, and adjusting the supporting force of the active roll stabilizer to a first preset supporting force when the road on which the vehicle travels is classified into the low frictional road without the VSM operating signal.

The method, in the increasing friction of the MDPS unit of the vehicle when the road on which the vehicle travels is determined as the low frictional road or the road having the uneven road surface when classifying the road on which the vehicle travels into the normal road, the low frictional road, the road having the first uneven road surface, and the road having the second uneven road surface, may further include adjusting the supporting force of the ARS to a second preset supporting force when the road on which the vehicle travels is classified into the road having the first uneven road surface, and adjusting the supporting force of the ARS to the first preset supporting force when the road on which the vehicle travels is classified into the road having the second uneven road surface frictional road.

In a further aspect of the present invention, a method of adjusting a friction of a motor driven power steering (MDPS) unit may include detecting road surface conditions of a road on which a vehicle travels, classifying the road on which the vehicle travels into a normal road, a low frictional road, a road having a first uneven road surface, and a road having a second uneven road surface, and increasing the friction of the MDPS unit of the vehicle when the road on which the vehicle travels is determined as the low frictional road or the road having the uneven road surface.

The method, in the classification of the road on which the vehicle travels into classifying the road on which the vehicle travels is classified into the normal road, the low frictional road, the road having the first uneven road surface, and the road having the second uneven road surface, may further include inputting a column torque of the vehicle, an output from the MDPS unit, a steering angle, a steering angular velocity, a vehicle speed, a wheel speed, a vehicle stability management (VSM) operating signal, determining the road as the first uneven road surface when a difference between wheel speeds of right and left tires of the vehicle is greater than a first preset uneven reference and less than a second preset uneven reference, determining the road as the low frictional road when a value obtained by dividing the column torque by the preset torque value is less than 1 (one), and determining the road as the normal road other else.

The method, in the increasing friction of the MDPS unit of the vehicle when the road on which the vehicle travels is determined as the low frictional road or the road having the uneven road surface when classifying the road on which the vehicle travels into the normal road, the low frictional road, the road having the first uneven road surface, and the road having the second uneven road surface, may further include adjusting a supporting force of an active roll stabilizer (ARS) to a third preset supporting force when the road on which the vehicle travels is classified into the low frictional road without a VSM operating signal, and adjusting the supporting force of the active roll stabilizer to a first preset supporting force when the road on which the vehicle travels is classified into the low frictional road without the VSM operating signal.

The method, in the increasing friction of the MDPS unit of the vehicle when the road on which the vehicle travels is determined as the low frictional road or the road having the uneven road surface when classifying the road on which the vehicle travels into the normal road, the low frictional road, the road having the first uneven road surface, and the road having the second uneven road surface, may further include adjusting the supporting force of the ARS to a second preset supporting force when the road on which the vehicle travels is classified into the road having the first uneven road surface, and adjusting the supporting force of the ARS to the first preset supporting force when the road on which the vehicle travels is classified into the road having the second uneven road surface frictional road.

In further another aspect of the present invention, a method of adjusting friction of a motor driven power steering (MDPS) unit may include spun determining whether a vehicle is accelerated higher than a preset acceleration or is decelerated lower than a preset deceleration, and increasing the friction of the MDPS unit of the vehicle when the vehicle is accelerated higher than the preset acceleration or is decelerated lower than the preset deceleration.

The method, in the increasing friction of the MDPS unit of the vehicle when the vehicle is accelerated higher than the preset acceleration or is decelerated lower than the preset deceleration, may further include adjusting a supporting force of an active roll stabilizer (ARS) of the vehicle to a first preset supporting force.

The first supporting force is 45 Nm, the second supporting force is 30 Nm, and the third supporting force is 15 Nm.

In further another aspect of the present invention, an apparatus for adjusting friction of a motor driven power steering (MDPS) unit may include a fail-safe determining logic unit receiving an error signal from the MDPS unit of a vehicle to output an A-level active roll stabilizer error signal and B- and C-level active roll stabilizer error signals, an uneven road surface estimating logic unit receiving a wheel speed signal of the vehicle and a preset uneven road surface profile signal to determine whether a road surface on which the vehicle travels is a first uneven road surface or a second uneven road surface, a vehicle stability management (VSM) operation determining logic unit receiving an activation/inactivation signal of the VSM to output a signal determining whether to activate an active roll stabilizer (ARS), a sudden acceleration-deceleration determining logic unit receiving a vehicle speed of the vehicle to determine whether to active the ARS, a road surface friction estimating logic unit receiving a steering angle, a steering angular velocity, and the vehicle speed of the vehicle to output a signal of determining whether the road surface on which the vehicle travels is a low frictional road or a high frictional road, a priority determining logic unit receiving the signals outputted from the fail-safe determining logic unit, the uneven road surface estimating logic unit, the VSM operation determining logic unit, the sudden acceleration-deceleration determining logic unit, and the road surface friction estimating logic unit to determine priorities of the signals, and an ARS controller receiving the signal outputted from the priority determining logic unit to output a signal of adjusting a supporting force of the ARS of the MDPS unit.

The fail-safe determining logic unit outputs an A-level ARS error signal when the signal received from the MDPS unit of the vehicle indicates an error of the steering angle, a low voltage of a battery, a high voltage of the battery, or an A-level error signal and a B- and C-level ARS error signals when the signal received from the MDPS unit of the vehicle indicates the B-level ARS error signal or the C-level ARS error signal.

The uneven road surface estimating logic unit receives a wheel speed signal of the vehicle and determines the road surface as the first uneven road surface when a difference between right and left wheel speeds is greater than a first preset uneven reference extracted from the uneven road surface profile signal and less than a second uneven reference, and the second uneven road surface when the difference is greater than the second uneven reference.

The VSM operation determining logic unit does not output an activating signal of the ARS when the VSM is not activated and outputs the activating signal of the ARS when the VSM is activated.

The sudden acceleration-deceleration determining logic unit receiving the vehicle speed of the vehicle to determine whether to active the ARS determines a sudden acceleration when the vehicle speed is greater than a preset acceleration and a sudden deceleration when the vehicle speed is lower than a preset deceleration and to output an ARS activating signal when the vehicle is suddenly accelerated or decelerated.

When the steering angle is greater than a first preset steering angle and less than a second preset steering angle, when the steering angular velocity of the vehicle exceeds a first preset steering angular velocity and is less than a second preset steering angular velocity, and when the vehicle speed of the vehicle is greater than a preset vehicle speed, the road surface friction estimating logic unit outputs a low frictional road determining signal when a value obtained by dividing the column torque of the vehicle by a preset torque is less than 1 (one) and a high frictional road determining signal when the value obtained by dividing the column torque of the vehicle by a preset torque is greater than 1 (one).

The priority determining logic unit processes signals received from the fail-safe determining logic unit, the uneven road surface estimating logic unit, the VSM operation determining unit, the sudden acceleration-deceleration determining unit, and the road surface friction estimating logic unit in the order of B- and C-level ARS error signals, an A-level ARS error signal, a first uneven road surface determining signal, a second uneven road surface determining signal, an ARS activating signal, an ARS activating signal based on a sudden acceleration-deceleration status, a low friction determining signal, and a high friction determining signal.

The ARS controller outputs a signal of adjusting the supporting force of the ARS to a third preset supporting force when B- and C-level ARS error signals, a low frictional road determining signal or a high frictional road determining signal are received, a signal of adjusting the supporting force of the ARS to a first preset supporting force when an ARS activating signal based on an A-level ARS error signal, a second uneven road surface determining signal, an ARS activating signal, and an ARS activating signal based on a sudden accelerated state or a sudden decelerated state, and a signal of adjusting the supporting force of the ARS to a second preset supporting force when a first uneven road surface determining signal is received.

The first supporting force is 45 Nm, the second supporting force is 30 Nm, and the third supporting force is 15 Nm.

Thus, the method of adjusting friction of an MDPS unit according to the present disclosure can implement a steering feeling of the MDPS unit by reflecting road surface conditions and driving environments of a driving vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a graph illustrating varied values of a supporting force of an active roll stabilizer for achieving an optimal steering feeling in the method of adjusting friction of an MDPS unit according to an exemplary embodiment of the present disclosure.

Figure 1:
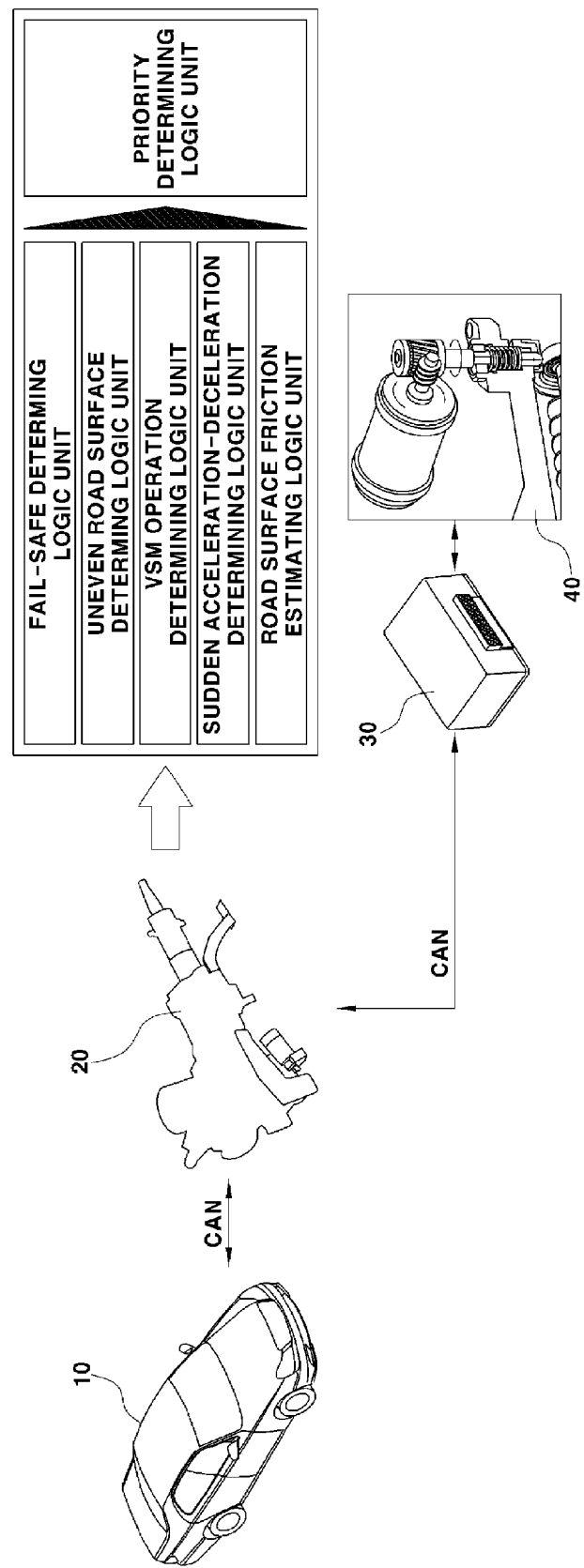
FIG. 1 is a schematic view illustrating a basic concept and basic configuration to which a method of adjusting friction of a motor driven power steering according to an exemplary embodiment of the present disclosure is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic view illustrating a basic concept and basic configuration to which a method of adjusting friction of a motor driven power steering according to an exemplary embodiment of the present disclosure is applied.

An apparatus for adjusting friction of a motor driven steering unit according to an exemplary embodiment of the present disclosure may adjust a steering feeling of a motor driven power steering (MDPS) unit 20 by adjusting of an active roll stabilizer 40 of the MDPS unit 20 installed in a vehicle 10.

To this end, a method of adjusting friction of the MDPS unit according to an exemplary embodiment of the present disclosure may provide optimal steering feeling suitable for road conditions by allowing an MDPS control logic unit 100 to control a signal applied to the active roll stabilizer regulator 30.

Figure 2:
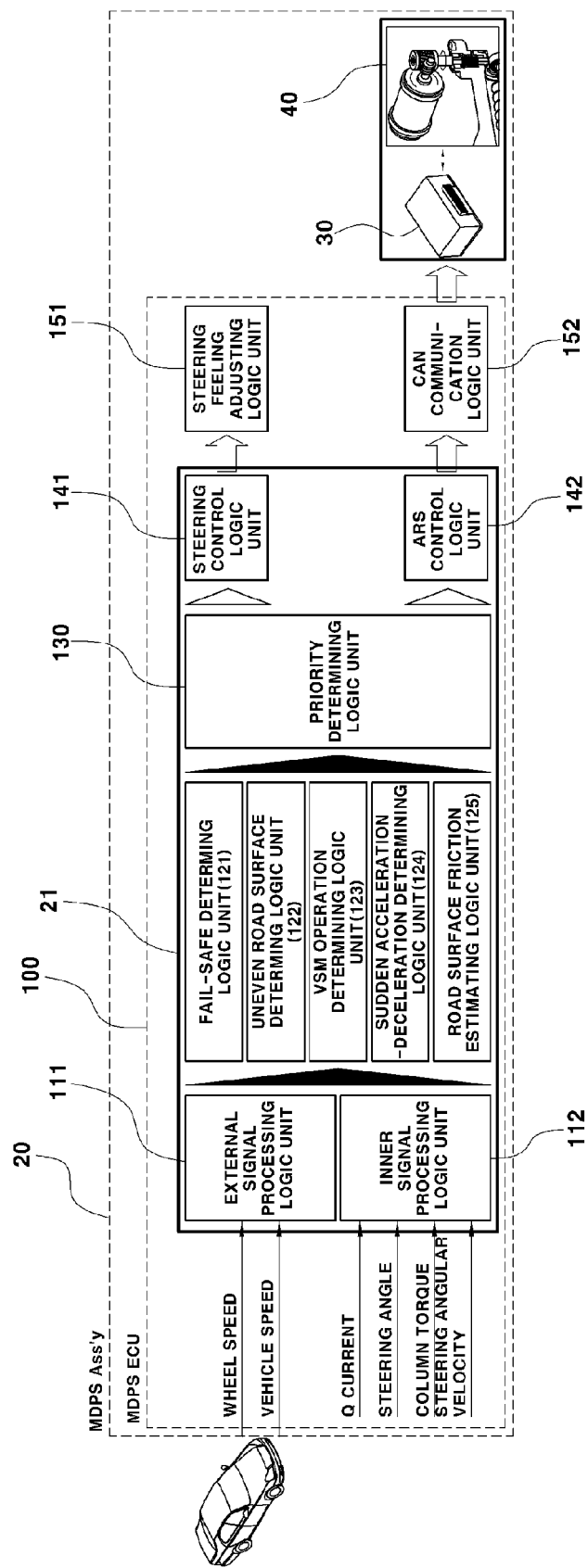
FIG. 2 is a block diagram illustrating an inner configuration of a control logic unit of a motor driven power steering unit to which a method of adjusting friction of a motor driven power steering according to an exemplary embodiment of the present disclosure is applied.

FIG. 2 is a block diagram illustrating an inner configuration of a control logic unit 100 of a motor driven power steering unit to which a method of adjusting friction of a motor driven power steering according to an exemplary embodiment of the present disclosure is applied.

The control logic unit 100 of an MDPS unit according to the exemplary embodiment of the present disclosure may be programmed in an ECU 21 of the MDPS unit 20.

The control logic unit 100 of an MDPS unit according to an exemplary embodiment of the present disclosure may include an external signal logic unit 111, an inner signal-processing logic unit 112, a fail-sage determination logic unit 121, an uneven road condition estimating logic unit 122, a vehicle stability management determination logic unit 123, a sudden acceleration-deceleration determination logic unit 124, a road surface friction estimating logic unit 125, a priority determination logic unit 130, a steering feeling control logic unit 141, and an active control logic unit 142.

The MDPS unit control logic unit 100 according to an exemplary embodiment of the present disclosure may receive a wheel speed and a vehicle speed of a vehicle 10 via the external signal logic unit 111 and a Q-current, a steering angle, a column torque, and a steering angular speed via the inner signal-processing logic unit 112.

Based on these input signals, the MDPS unit control logic unit 100 may analyze the road surface conditions on which the vehicle 10 travels to adjust the steering feeling of the MDPS unit 20.

The MDPS unit control logic unit 100 may apply a value estimated from values inputted from the external signal logic unit 111 and the inner signal-processing logic unit 112 to a steering feeling adjusting logic 151 and a CAN communication logic unit 152 to control the active roll stabilizer 40 of the MDPS unit 20 and to implement a steering feeling suitable for the road surface conditions.

Figure 3:
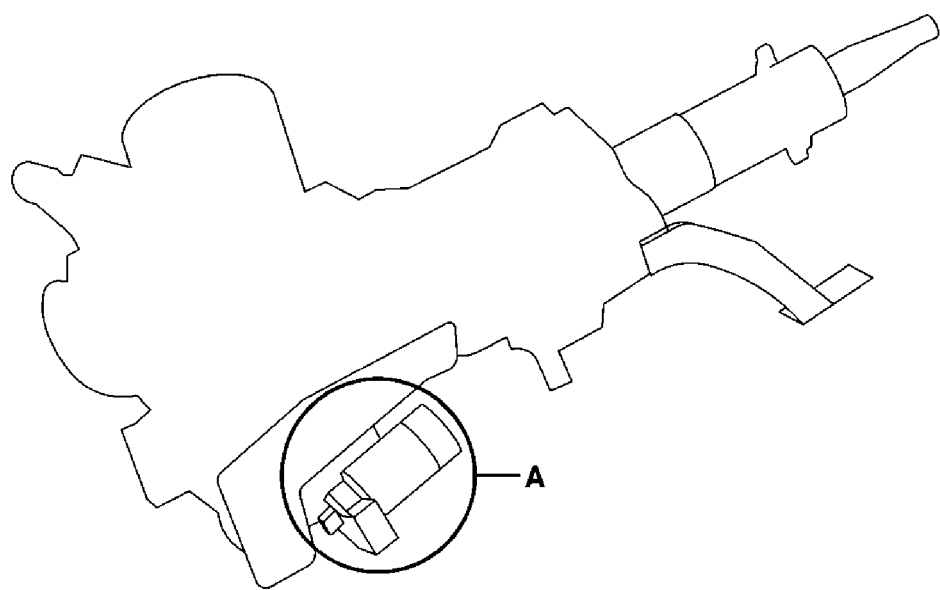
FIG. 3 is a perspective view illustrating a motor driven power steering unit to which a method of adjusting friction of a motor driven power steering according to an exemplary embodiment of the present disclosure is applied.

FIG. 3 is a perspective view illustrating the MDPS unit 20 to which a method of adjusting friction of a motor driven power steering according to an exemplary embodiment of the present disclosure is applied.

The method of adjusting friction of an MDPS unit according to an exemplary embodiment of the present disclosure may varying a supporting force of the active roll stabilizer 40 provided in the MDPS unit 20 to control a steering feeling transmitted from the MDPS unit 20.

Figure 4:
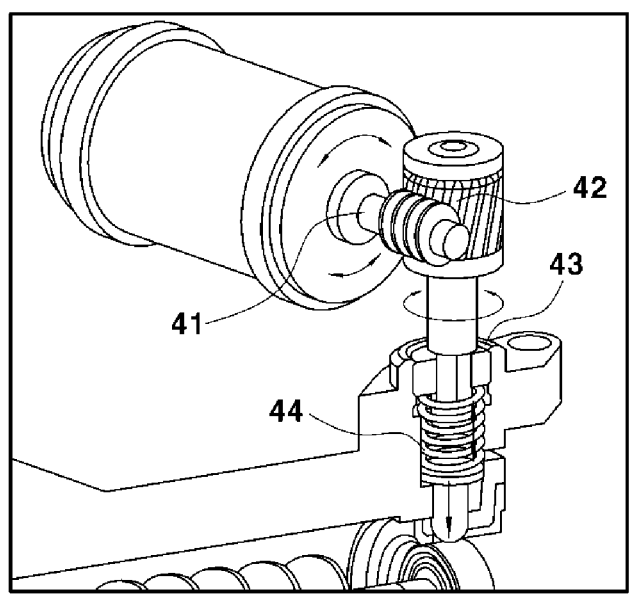
FIG. 4 is an enlarged view of 'A' of FIG. 3.

FIG. 4 is an enlarged view of 'A' of FIG. 3.

The active roll stabilizer 40 employed in the method of adjusting friction of an MDPS unit according to an exemplary embodiment of the present disclosure may include a worm gear 41 as a motor shaft, a worm wheel 42, a plug 43, and a spring 44. That is, the worm gear 41 rotates clockwise or counterclockwise to rotate the worm wheel 42 at a reduction ratio of 15:1 so that compression of the spring 44 can be controlled to adjust the supporting force of the active roll stabilizer 40 from 15 Nm to 45 Nm.

Figure 5:
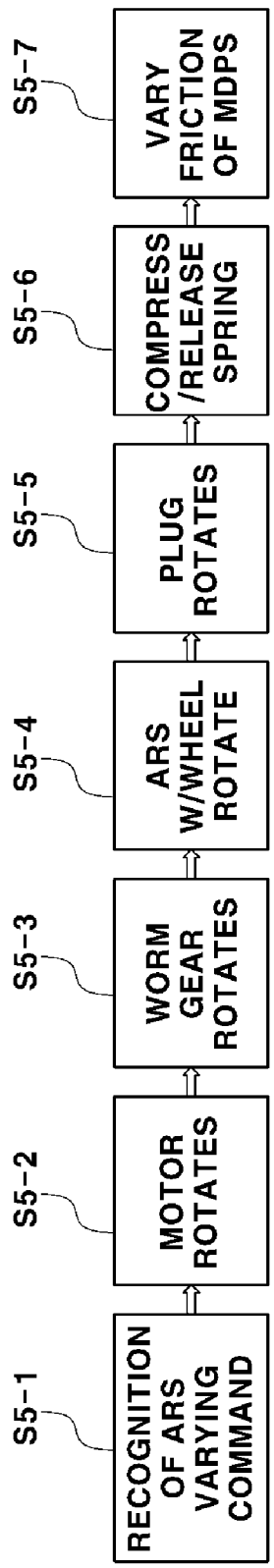
FIG. 5 is a view illustrating processes of adjusting friction of the motor driven power steering unit in the method of adjusting friction of the motor driven power steering system according to an exemplary embodiment of the present disclosure.

FIG. 5 is a view illustrating processes of adjusting friction of the MDPS unit 20 in the method of adjusting friction of an MDPS unit according to an exemplary embodiment of the present disclosure.

The MDPS unit 20 according to an exemplary embodiment of the present disclosure may receive a command of controlling the active roll stabilizer 40 (S5-1).

Upon receiving the command, a motor rotates (S5-2) and the worm gear 41 rotates at the same time (S5-3) so that the worm wheel 42 of the active roll stabilizer 40 rotates (S5-4).

The plug 43 rotates (S5-5) to compress the spring 44 and the compressed spring 44 leads to vary friction of the MDPS unit 20 (S5-7).

The adjustment of the steering feeling of the MDPS unit 20 in the method of adjusting friction of an MDPS unit according to an exemplary embodiment of the present disclosure may mean varying of friction, that is, varying of a frictional feeling.

FIG. 6 is a graph illustrating varied values of the supporting force of the active roll stabilizer 40 for achieving an optimal steering feeling in the method of adjusting friction of an MDPS unit according to an exemplary embodiment of the present disclosure.

In the method of adjusting friction of an MDPS unit according to an exemplary embodiment of the present disclosure, a section of an uneven road surface may be classified into a highly uneven road surface and a less uneven road surface. The less uneven road surface may be called as a first uneven road surface while the highly uneven road surface may be called as a second uneven road surface.

On the uneven road surfaces, it needs a high friction for the reduction of kickback and it needs a heavy steering feeling for the improvement of driving stability.

Thus, the method of adjusting friction of an MDPS unit according to an exemplary embodiment of the present disclosure, upon reception of the wheel speed and the vehicle speed of the vehicle 10, may adjust the supporting force of the active roll stabilizer 40, such that the supporting force of the active roll stabilizer 40 may be adjusted to 45 Nm on the highly uneven road surface and to 30 NM on the less uneven road surface.

In the method of adjusting friction of an MDPS unit according to an exemplary embodiment of the present disclosure, when the road surface is determined as a low frictional road surface, the MDPS unit 20 may be controller to reduce the friction for the improvement of restoration. That is, the column torque and outputs from the MDPS unit 20 may be used to adjust the supporting force of the active roll stabilizer 40 to 15 Nm.

The method of adjusting friction of an MDPS unit according to an exemplary embodiment of the present disclosure may detect an operating signal from the vehicle stability management to determine whether the vehicle slips.

When the vehicle slips, since the high friction and the heavy steering feeling are needed for the prevention of wrong steering by a driver, a procedure of adjusting the supporting force of the active roll stabilizer 40 to 45 Nm may be performed.

In addition to, the method of adjusting friction of an MDPS unit according to an exemplary embodiment of the present disclosure may detect the sudden acceleration and deceleration of the vehicle to vary the steering feeling. That is, since the high friction and the heavy steering feeling are needed to prevent a torque and a braking steer from being focused, the procedure of adjusting the supporting force of the active roll stabilizer 40 to 45 Nm may be performed.

The method of adjusting friction of an MDPS unit according to an exemplary embodiment of the present disclosure may detect an error of the MDPS unit 20 to adjust the supporting force of the active roll stabilizer 40 to provide different steering feelings by respective levels. For example, the supporting force may be adjusted to 45 Nm in a case of an ARS-A-Fault-Flag and 15 Nm in a case of ARS_BC-Fault-Flags.

As described above, in the method of adjusting friction of an MDPS unit according to an exemplary embodiment of the present disclosure, the respective adjusted supporting forces of the active roll stabilizer 40 may be called a first adjusted supporting force, a second adjusted supporting force, and a third adjusted supporting force, wherein the first adjusted supporting force may be 45 Nm, the second adjusted supporting force 30 Nm, and the third adjusted supporting force 15 Nm. However, the adjusted supporting forces are not limited thereto but may be selected as proper values according to an exemplary embodiment of the present disclosure.

Figure 7:
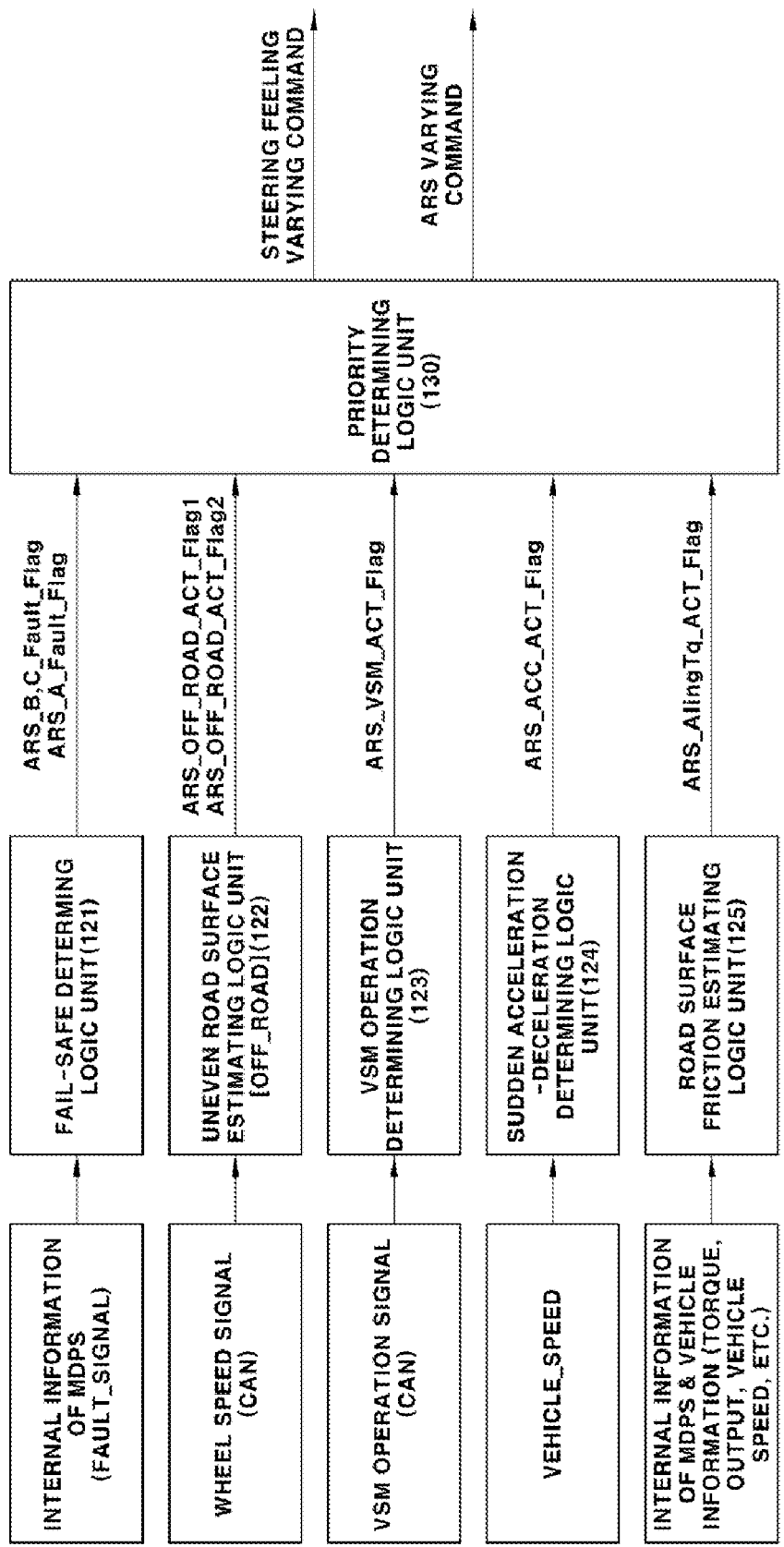
FIG. 7 is a schematic block diagram illustrating a friction adjusting apparatus of an MDPS unit according to an exemplary embodiment of the present disclosure.

FIG. 7 is a schematic block diagram illustrating a friction adjusting apparatus of an MDPS unit according to an exemplary embodiment of the present disclosure.

Hereinafter, the respective elements will be described in detail.

Figure 8:
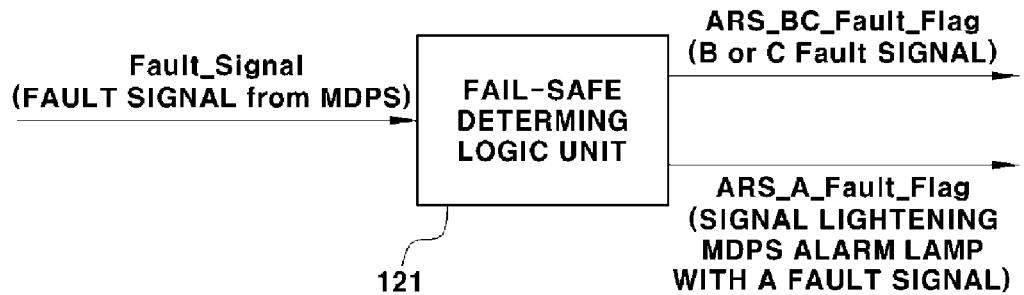
FIG. 8 is a schematic block diagram illustrating operations of a fail-safe determining logic unit of the friction adjusting apparatus of an MDPS unit according to an exemplary embodiment of the present disclosure.

FIG. 8 is a schematic block diagram illustrating operations of a fail-safe determining logic unit 121 of the friction adjusting apparatus of an MDPS unit according to an exemplary embodiment of the present disclosure.

The fail-safe determination logic unit 121 of the friction adjusting apparatus of the MDPS unit according to an exemplary embodiment of the present disclosure may receive a Fault-signal from the MDPS unit 20 to determine whether an error occurs in the MDPS unit 20.

To this end, the fail-safe determination logic unit 121 may receive the Fault-signal from the MDPS 20 and determine the importance thereof to transmit an ARS-A_Fault_Flag or ARS_BC-Fault_Flags.

Figure 9:
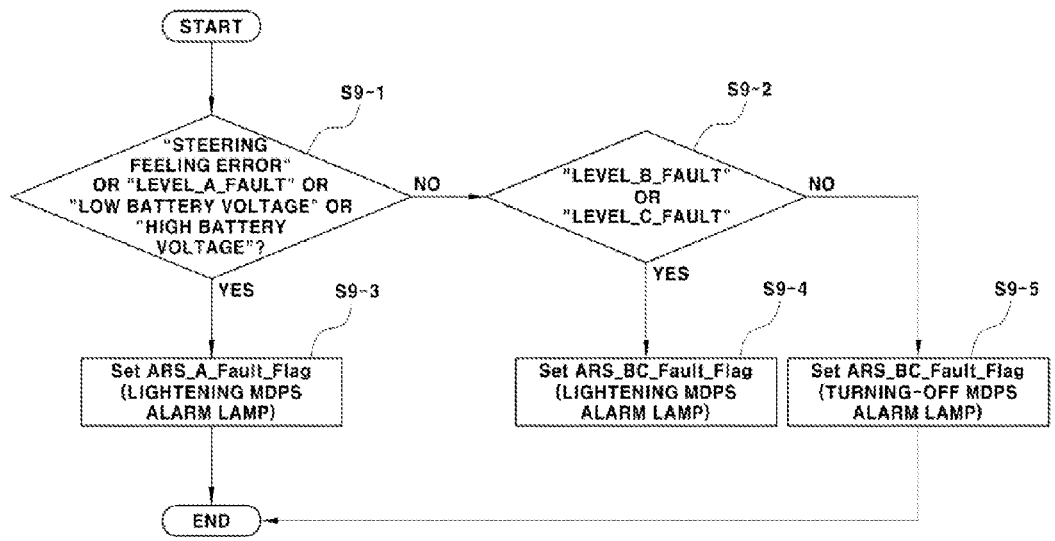
FIG. 9 is a flowchart illustrating procedure of determining importance of an error occurred in an MDPS unit by the fail-safe determining logic unit.

FIG. 9 is a flowchart illustrating procedure of determining importance of an error occurred in the MDPS unit 20 by the fail-safe determining logic unit 121.

The fail-safe determination logic unit 121 according to an exemplary embodiment of the present disclosure may transmit the ARS_A_Fault_Flag in the case of an erroneous steering angle of the MDPS unit 20, a low voltage of a battery, a high voltage of the battery, or the ARS_A_Fault (S9-1) (S9-3).

However, when the condition is not satisfied, the fail-safe determination logic unit may check whether the ARS_A_Fault is the ARS_B_Fault or the ARS_C_Fault (S9-2) to transmit the ARS_B_Fault_Flag and the ARS_C_Fault_Flag (S9-4) and may perform clearing of the ARS_Fault otherwise (S9-5).

Figure 10:
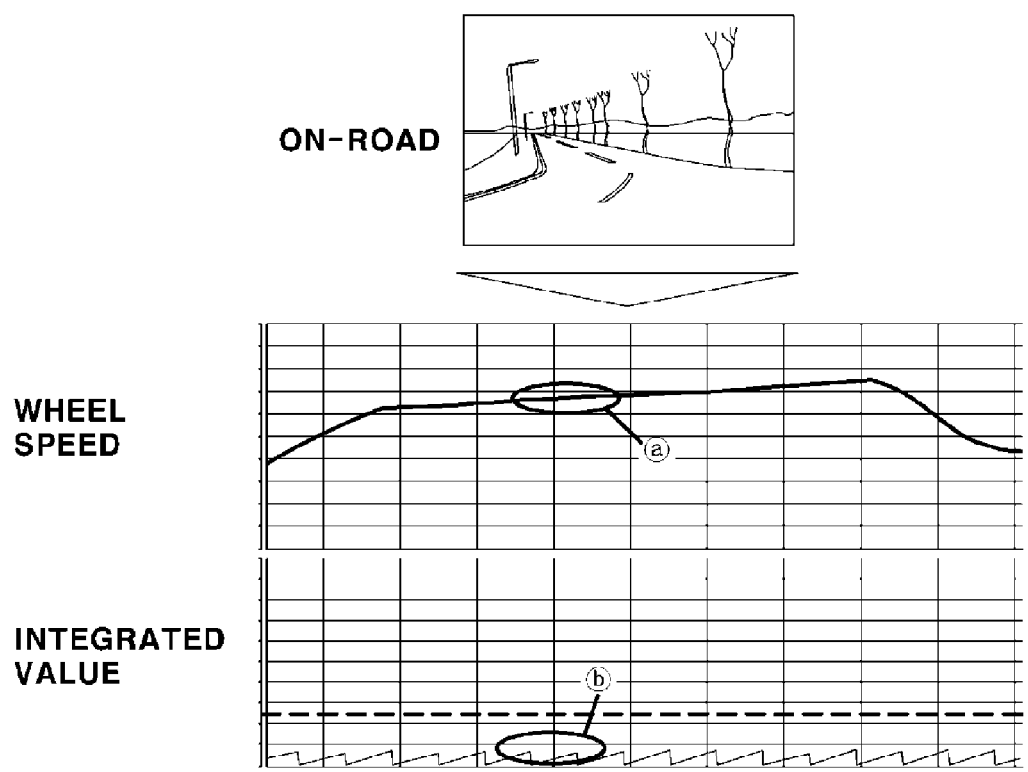
FIG. 10 is a view illustrating a method of estimating an on-road surface in the friction adjusting method of the MDPS unit according to an exemplary embodiment of the present disclosure.
Figure 11:
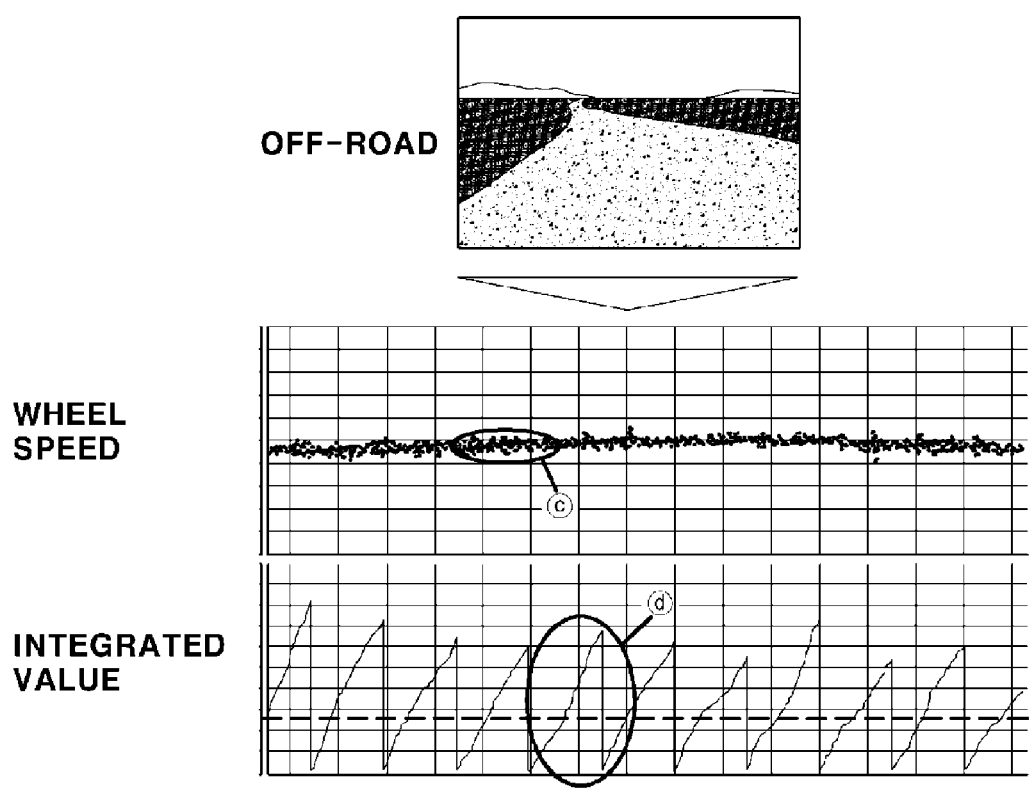
FIG. 11 is a view illustrating a method of estimating an uneven road surface in the friction adjusting method of the MDPS unit according to an exemplary embodiment of the present disclosure.

FIGS. 10 and 11 are a view illustrating a method of estimating the uneven road surface in the friction adjusting method of the MDPS unit according to an exemplary embodiment of the present disclosure.

First, FIG. 10 is a view illustrating the wheel speed and an integrated value of instantaneous rates of change in a case of on-road.

When driving on a paved road, it is known that the instantaneous rate of change in the wheel speed is small and the integrated value thereof is very small.

On the contrary, when driving on an off-road, the wheel speed and the integrated value of the instantaneous rate of change are very large.

Thus, the method of adjusting friction of an MDPS unit according to an exemplary embodiment of the present disclosure may check these phenomena to determine whether the vehicle drives on an uneven road surface.

Figure 12:
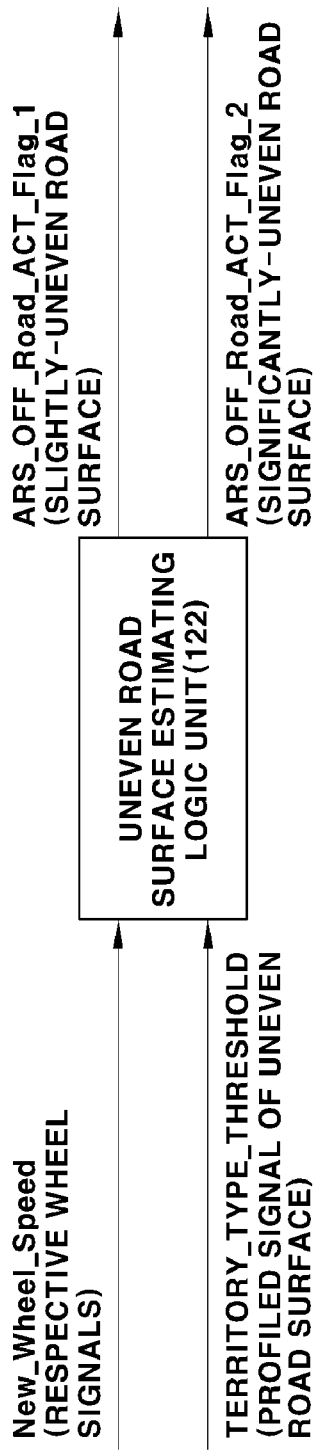
FIG. 12 is a block diagram illustrating input and output values of an uneven road surface estimating logic unit according to an exemplary embodiment of the present disclosure.

FIG. 12 is a block diagram illustrating input and output values of an uneven road surface estimating logic unit according to an exemplary embodiment of the present disclosure.

The uneven road surface estimating logic unit 122 according to an exemplary embodiment of the present disclosure may receive the wheel speeds of respective tires and an uneven road surface profile signal Territory_type_threshold to transmit a signal determined whether a current road surface is uneven slightly or significantly.

Figure 13:
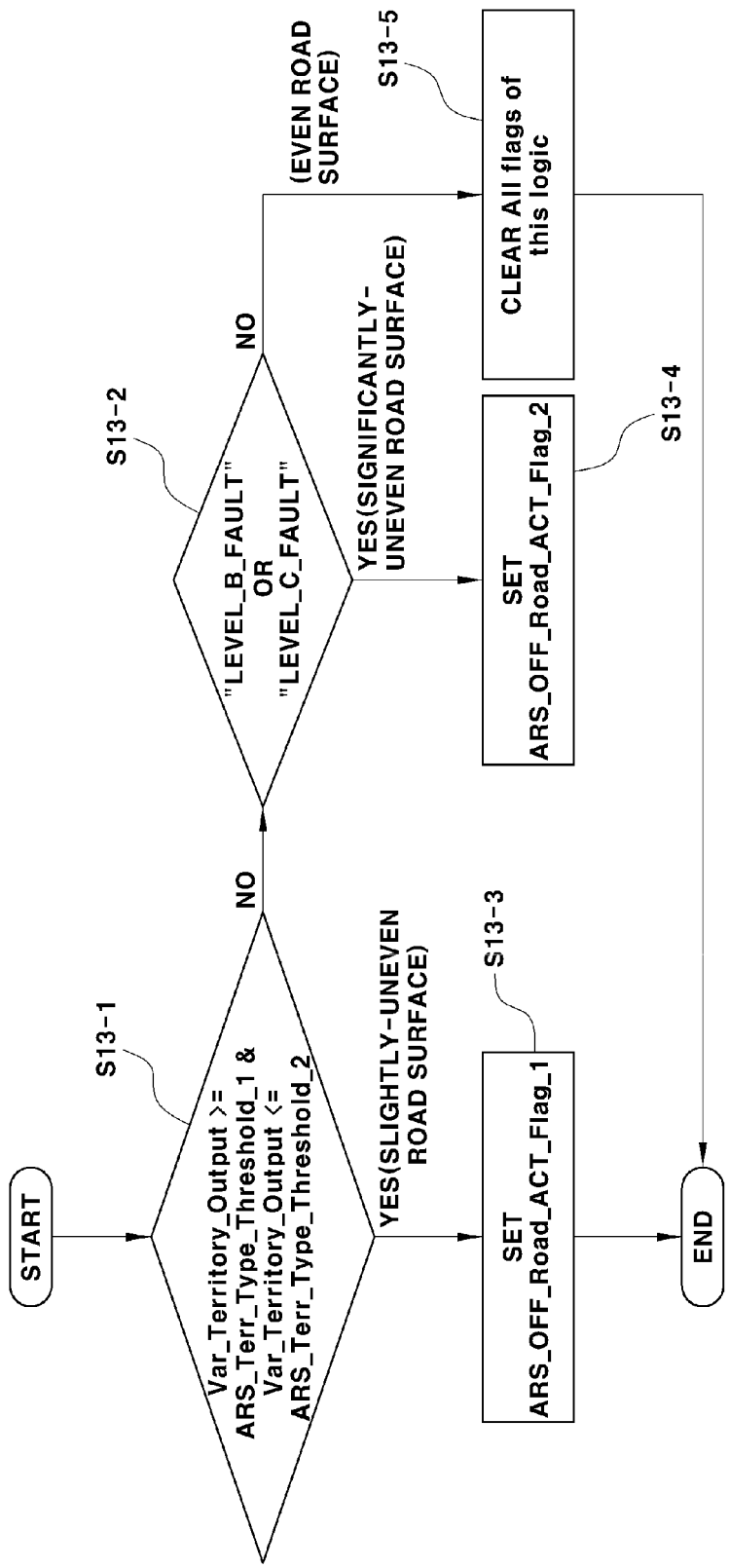
FIG. 13 is a flowchart illustrating determination of road surface conditions by the uneven road surface estimating logic unit according to an exemplary embodiment of the present disclosure.

FIG. 13 is a flowchart illustrating determination of road surface conditions by the uneven road surface estimating logic unit 122 according to an exemplary embodiment of the present disclosure.

First, the uneven road surface estimating logic unit 122 may perform a procedure of receiving the wheel speeds of right and left tires and calculating a difference thereof Var_Territory_output to compare the calculated difference with a preset profile value (S13-1). Here, the preset profile value may be assigned to a first uneven reference ARS_T-err_Type_Threshold_1 and a second uneven reference ARS_Terr_Type_Threshold_2, wherein the uneven references may be prepared in the form of a map and stored in advance.

When the difference between the wheel speeds of the right and left tires is greater than the first uneven preset reference and less than the second uneven reference, a signal indicating that a road surface is slightly uneven ARS-Off_Road_ACT_Flag_1 may be outputted (S13-1).

When the difference between the wheel speeds of the right and left tires is greater than the second uneven preset reference (S13-2), the uneven road surface estimating logic unit 122 may output a signal indicating that a road surface is significantly uneven ARS-Off_Road_ACT_Flag_2 (S13-4).

However, when the difference between the wheel speeds of the right and left tires is less than the uneven preset references, it may be determined the road surface is not uneven and all signals may be reset (S13-5).

Figure 14:
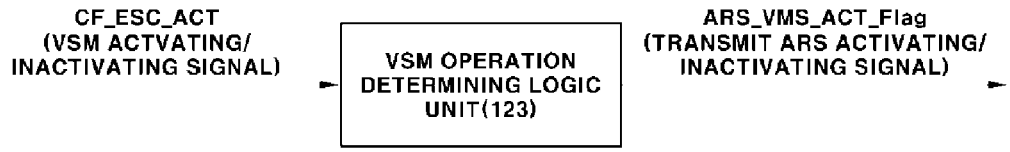
FIG. 14 is a block diagram illustrating input and output signals of a vehicle stability management operation determining logic unit according to an exemplary embodiment of the present disclosure.

FIG. 14 is a block diagram illustrating input and output signals of a vehicle stability management operation determining logic unit 123 of according to an exemplary embodiment of the present disclosure.

The vehicle stability management operation determining logic unit 123 of the MDPS unit according to an exemplary embodiment of the present disclosure may receive a signal CF_ESC_ACT determining whether the vehicle stability management is activated to transmit a signal ARS_VSM_ACT_Flag determining whether to activate the active roll stabilizer 40.

Figure 15:
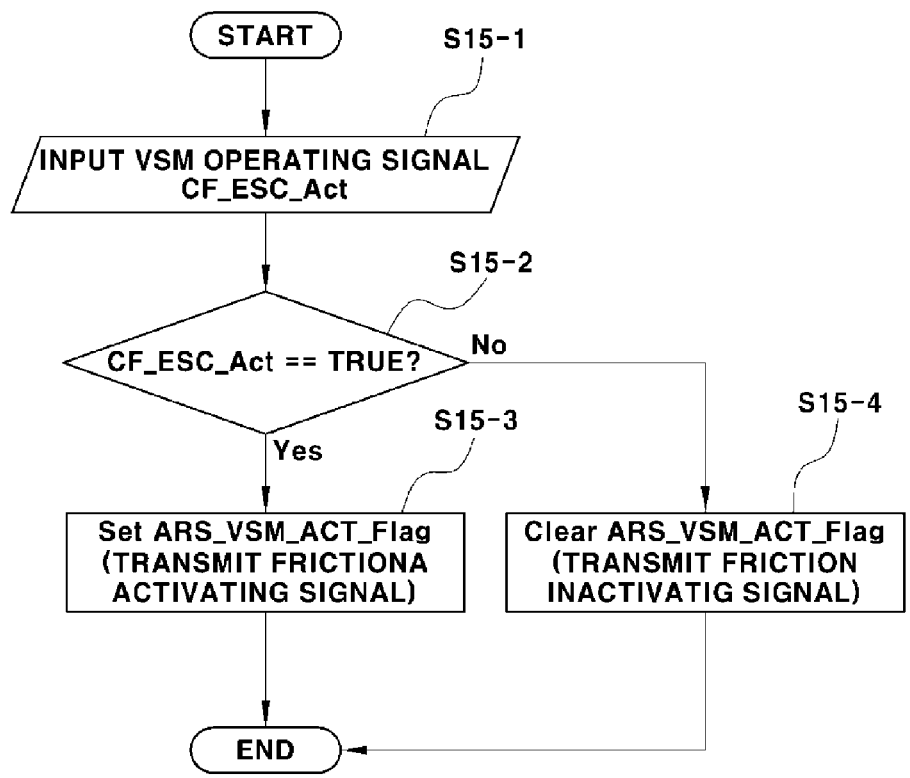
FIG. 15 is a flowchart illustrating operations of the vehicle stability management operation determining logic unit.

FIG. 15 is a flowchart illustrating operations of the vehicle stability management operation determining logic unit 123.

First, the vehicle stability management operation determining logic unit 123 according to an exemplary embodiment of the present disclosure may receive an active signal of the vehicle stability management (S15-1).

The vehicle stability management operation determining logic unit may check whether the vehicle stability management is activated (S15-2). If the vehicle stability management is activated, the vehicle stability management operation determining logic unit may transmit a friction-activating signal ARS_VSM_ACT_Flag (S15-3). If not, the vehicle stability management operation determining logic unit may clear a signal transmitted not to activate the active roll stabilizer 40 (S15-4).

Figure 16:
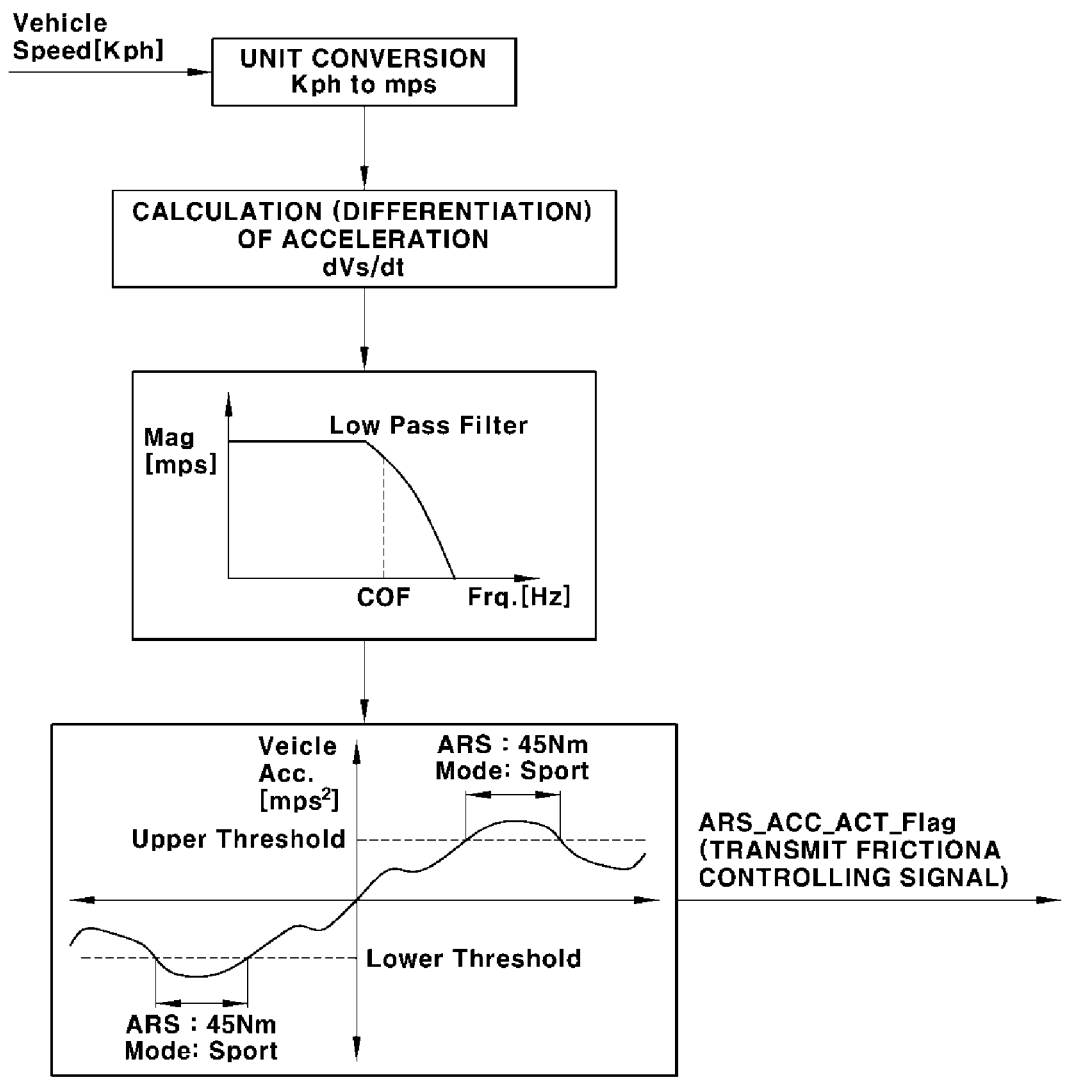
FIG. 16 is a view illustrating determination of sudden acceleration and deceleration of a vehicle in the friction adjusting method of the MDPS unit according to an exemplary embodiment of the present disclosure.

FIG. 16 is a view illustrating determination of sudden acceleration and deceleration of a vehicle in the friction adjusting method of the MDPS unit according to an exemplary embodiment of the present disclosure.

The sudden acceleration-deceleration determining logic unit 124 of the friction adjusting apparatus of an MDPS unit according to an exemplary embodiment of the present disclosure may differentiate a vehicle speed to determine the sudden acceleration and the sudden deceleration.

Figure 17:
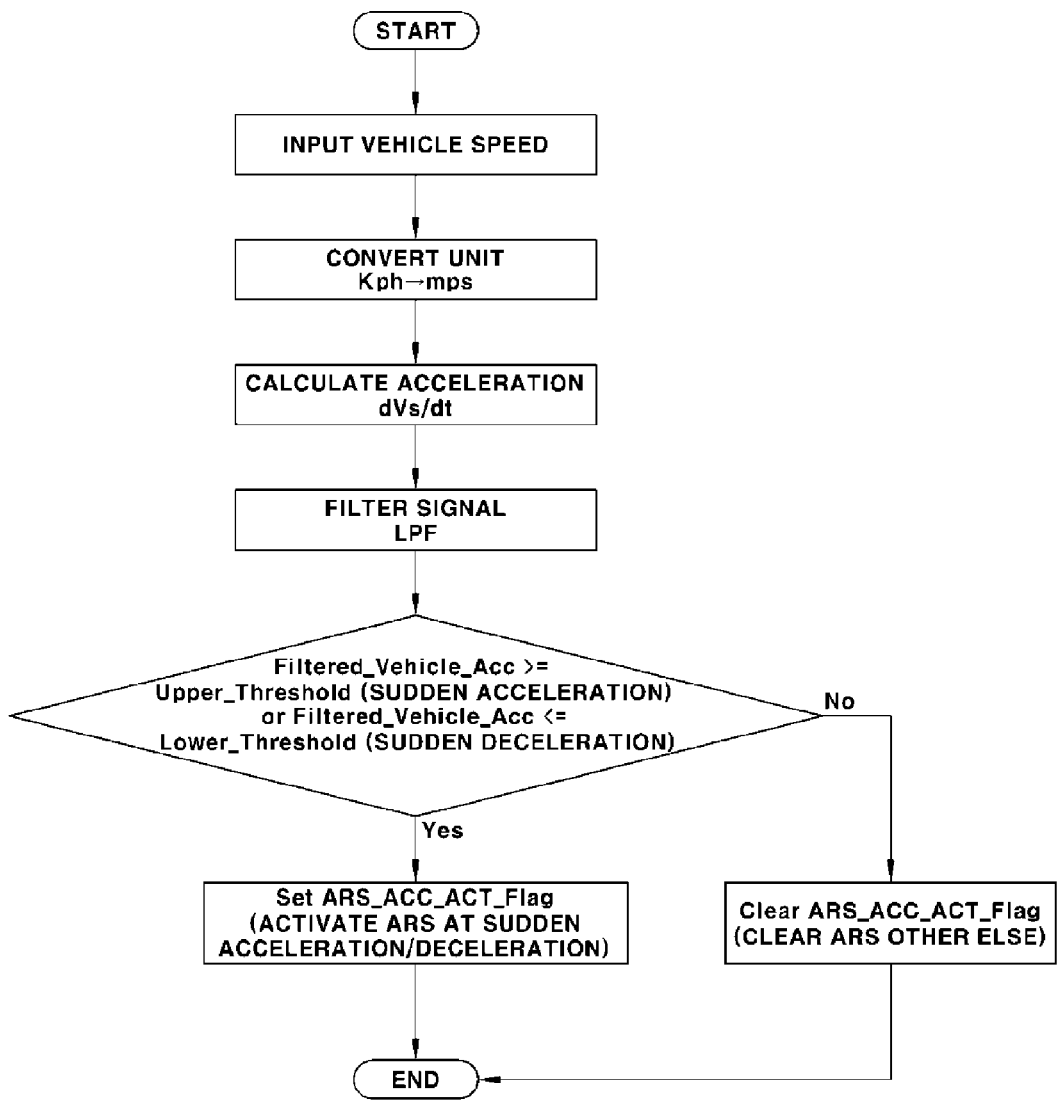
FIG. 17 is a flowchart illustrating procedure of determining sudden acceleration of deceleration of a vehicle in the friction adjusting method of the MDPS unit according to an exemplary embodiment of the present disclosure.

FIG. 17 is a flowchart illustrating procedure of determining sudden acceleration of deceleration of a vehicle in the friction adjusting method of the MDPS unit according to an exemplary embodiment of the present disclosure.

First, the sudden acceleration-deceleration determining logic unit 124 according to an exemplary embodiment of the present disclosure may perform a procedure of receiving the vehicle speed (S17-1).

The sudden acceleration-deceleration determining logic unit 124 may perform a procedure of converting the received vehicle speed into an MPS unit system (S17-2).

The sudden acceleration-deceleration determining logic unit 124 may differentiate this vehicle speed to calculate an acceleration (S17-3) to filter the same through a low pass band filter (S17-4) and determine whether the acceleration Filtered_Vehicle_Acc is higher than a preset acceleration Upper_Threshold or than a preset deceleration Lower_Threshold (S17-5).

When the acceleration is higher than the preset acceleration or the preset deceleration, the sudden acceleration-deceleration determining logic unit may determine that the vehicle is suddenly decelerated currently and may transmit an active roll stabilizer activating signal ARS_ACC_ACT_Flag (S17-6). If not sudden deceleration, the sudden acceleration-deceleration determining logic unit may clear this determination.

Figure 18:
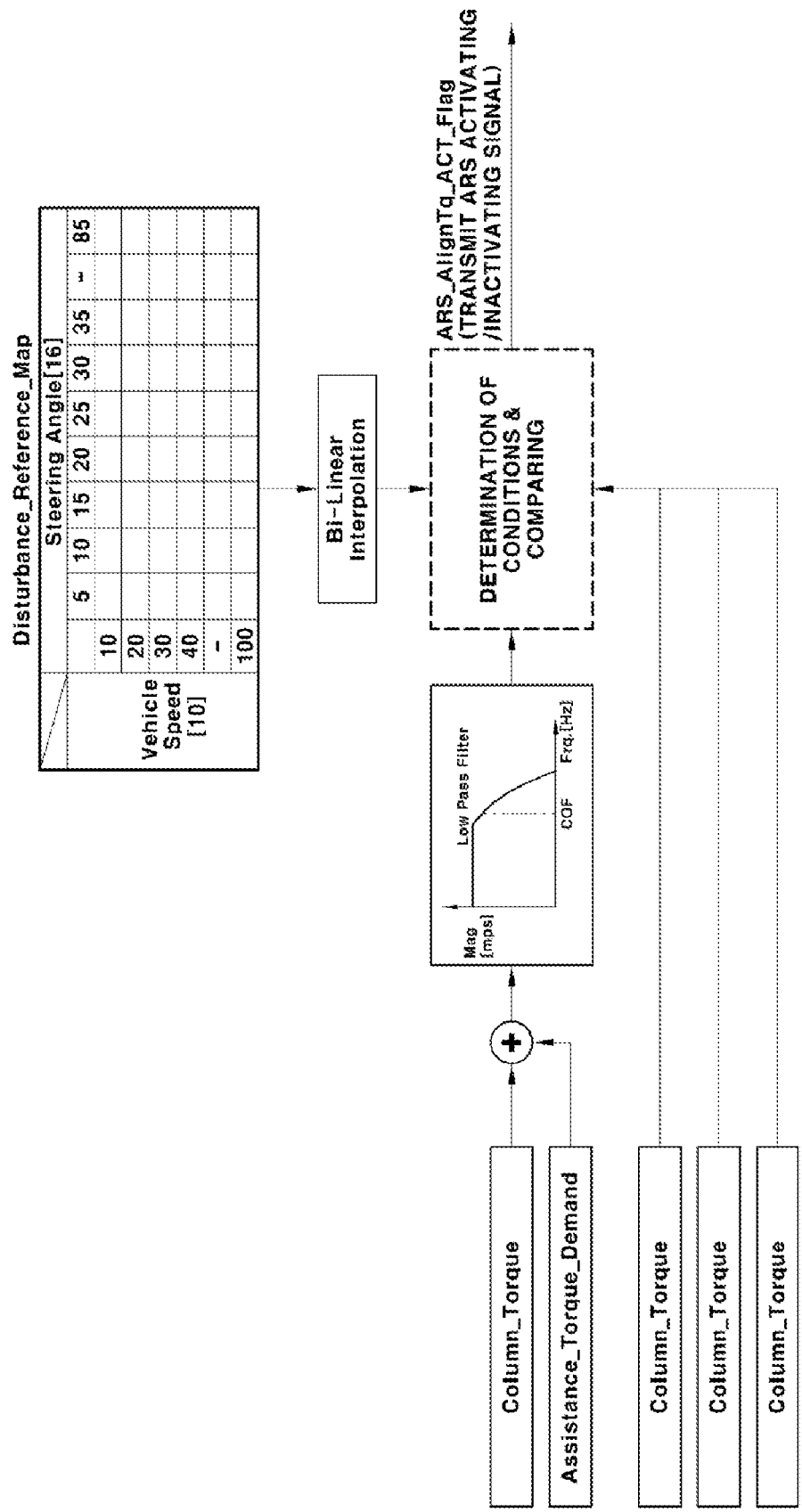
FIG. 18 is a view illustrating logic for estimating a road surface friction.

FIG. 18 is a view illustrating logic for estimating a road surface friction.

In detail, the road surface friction estimating logic unit 125 of the method of adjusting friction of an MDPS unit according to an exemplary embodiment of the present disclosure may compare a variation of the friction of tires with a torque ratio of change of the MDPS unit 20 and may set the results of mapping the torque ratio of change to an actual asphalt road as a reference mapping value to increase the friction of the active roll stabilizer 40 for the improvement of steering of a vehicle when the variation of the friction is less than the reference mapping value.

Figure 19:
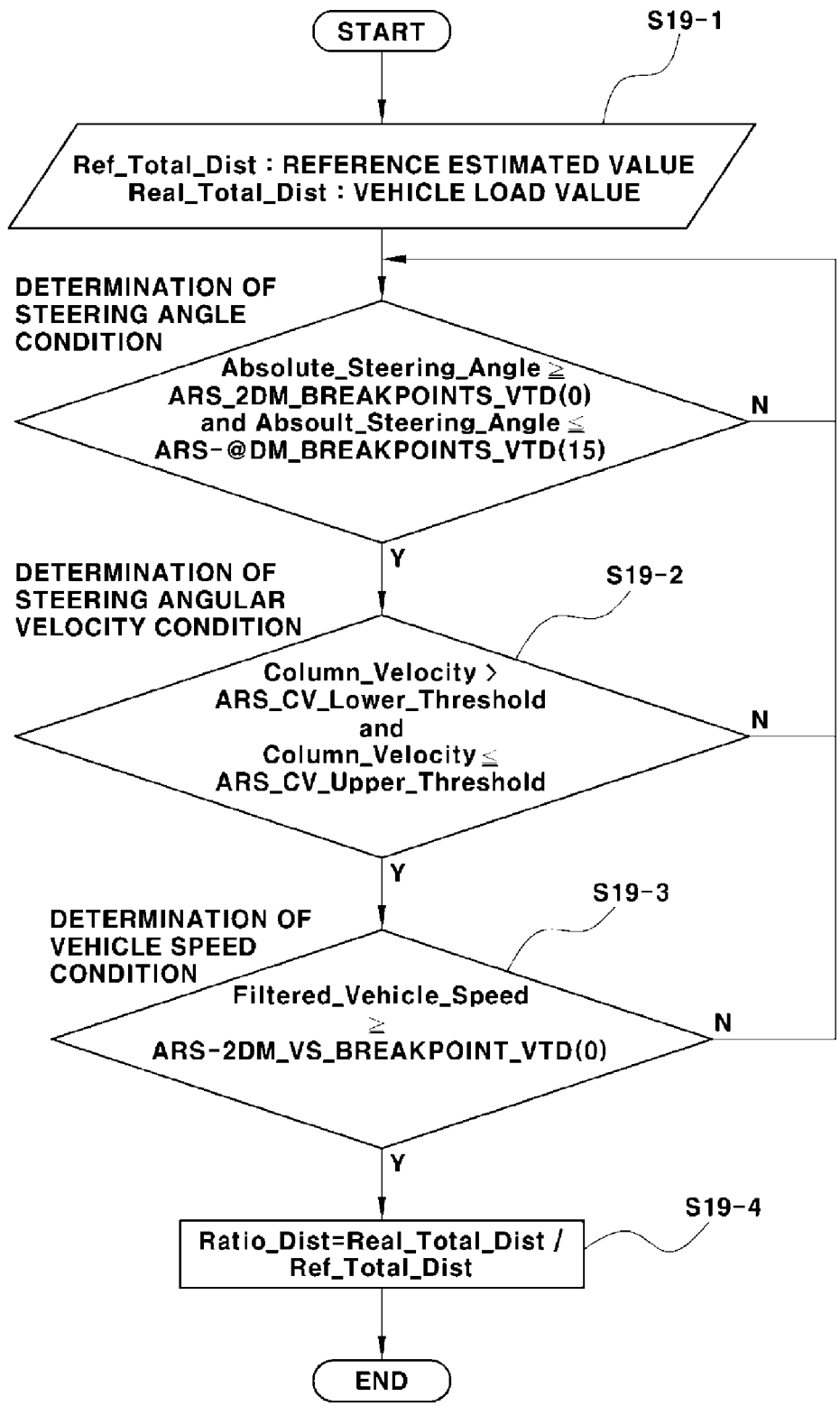
FIG. 19 is a flowchart illustrating the procedure of FIG. 18.

FIG. 19 is a flowchart illustrating the procedure of FIG. 18.

First, the road surface friction estimating logic unit 125 according to an exemplary embodiment of the present disclosure may perform a procedure of receiving a reference estimated value Ref_Total_dist and a vehicle load Real_Total_Dist (S19-1).

Next, the road surface friction estimating logic unit 125 according to an exemplary embodiment of the present disclosure may receive a steering angle Absolute_Steering_Angle and a steering angular velocity Column_Velocity, and a vehicle speed Filtered_Vehicle_Speed to compare the same with respective references.

First, the road surface friction estimating logic unit 125 may determine whether the steering angle is within a preset steering angle ARS_2DB_Breakpoint_VTD (S19-2).

When the steering angle is within the preset steering angle range, a procedure of determining whether the steering angular velocity is greater than a preset upper and lower limits of the angular velocity ARS_CV_Upper_Threshold and ARS_CV_Lower_Threshold (S19-3).

Next, a procedure of determining whether the vehicle speed is greater than a preset vehicle speed ARS_2DM_Breakpoint_VTD (S19-4) may be performed.

When the above procedures are satisfied, the road surface friction estimating logic unit 125 according to an exemplary embodiment of the present disclosure may perform a procedure of dividing the actual torque value Real_Total_Dist by a reference torque value Ref_Total_Dist to obtain a torque ratio Ratio_Dist (S19-4). In this step, the torque ratio is greater than 1 (one), it is determined high friction such that the friction of the active roll stabilizer 40 is not compensated. When the torque ratio is less than 1 (one), the road surface friction estimating logic unit 125 may transmit a signal ARS_AlignTq_ACT_Flag of compensating friction of the active roll stabilizer 40.

Figure 20:
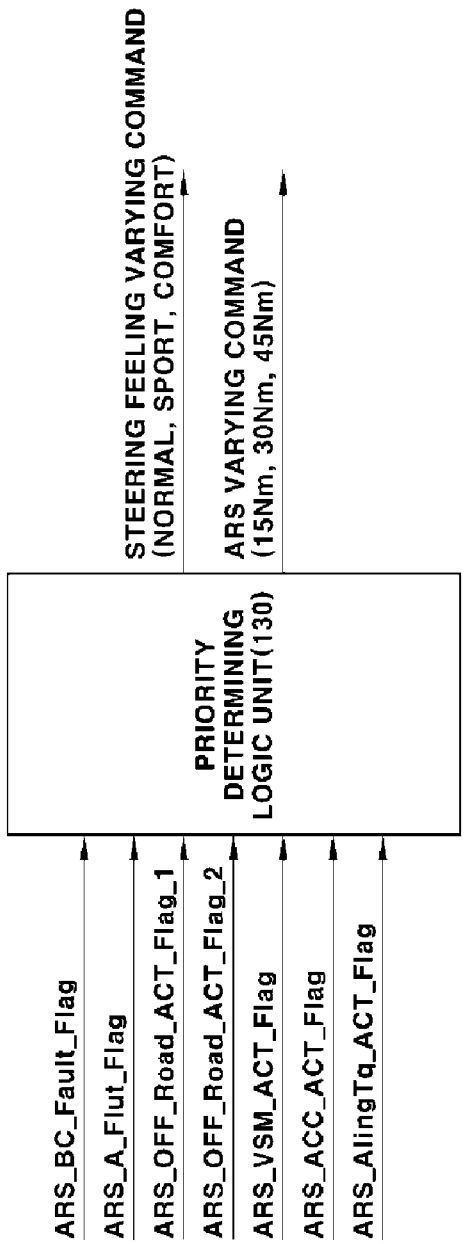
FIG. 20 is a view illustrating input and output signals of a priority determining logic unit according to an exemplary embodiment of the present disclosure.

FIG. 20 is a view illustrating input and output signals of a priority determining logic unit 130 according to an exemplary embodiment of the present disclosure.

The priority determining logic unit 130 according to an exemplary embodiment of the present disclosure may receive signals outputted from the respective logic units to transmit a steering feeling changing command Normal, Sport, and Comport and an active roll stabilizer changing command 15 Nm, 30 Nm, and 45 Nm.

Figure 21:
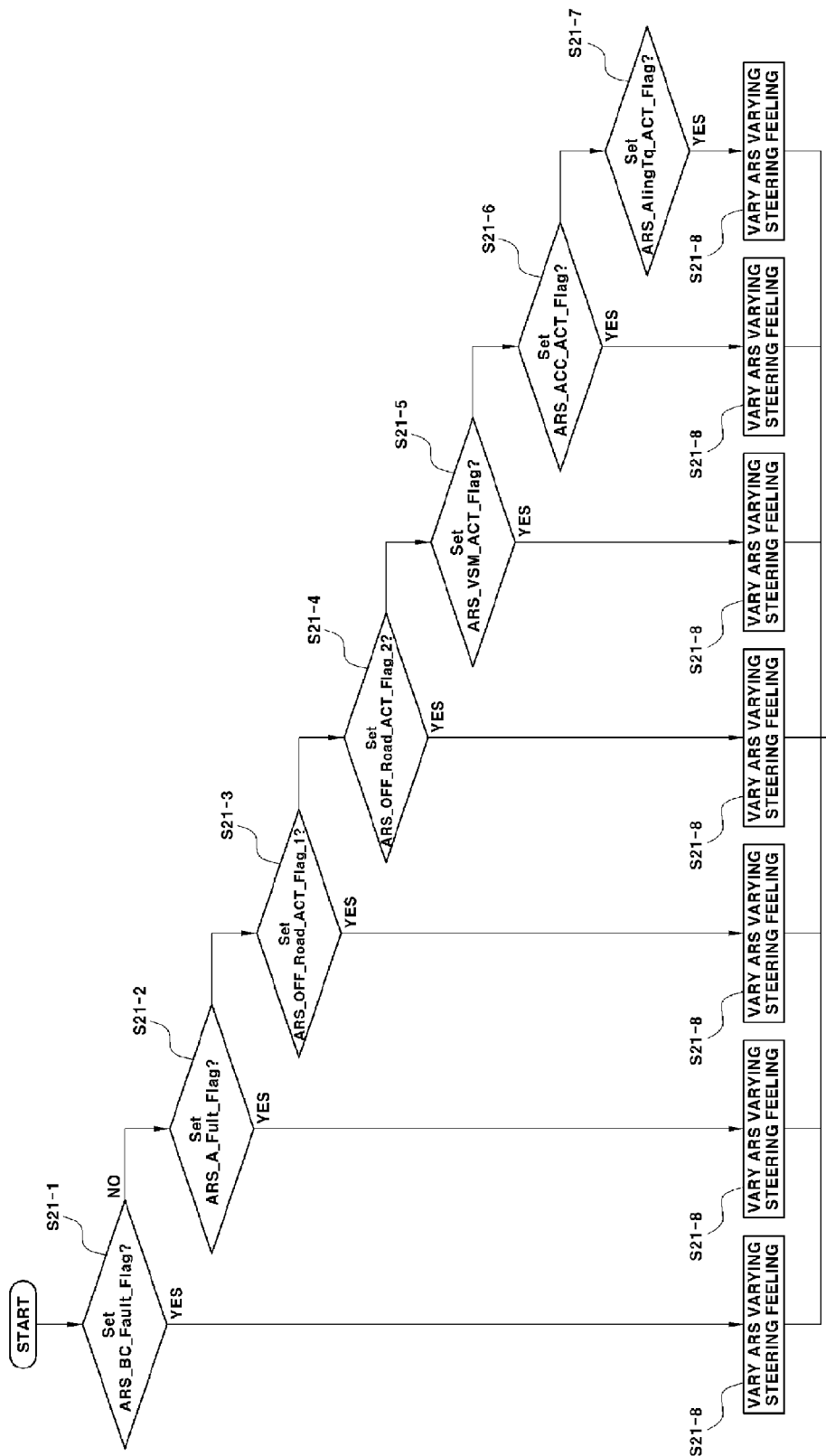
FIG. 21 is a flowchart illustrating the procedure of determining priority of respective signals by the priority determining logic unit.

FIG. 21 is a flowchart illustrating the procedure of determining priority of respective signals by the priority determining logic unit 130.

The priority determining logic unit 130 may determine the B- and C-level error signals among the inputted signals having the highest priority (S21-1), the A-level error signal having the next highest priority (S21-2), and the first uneven road surface signal (S21-3), the second uneven road surface signal (S21-4), the vehicle stability management activating signal (S21-5), the sudden acceleration-deceleration determining signals (S21-6), and the low frictional road or high frictional road determining signal (S21-7) in sequence to change the supporting force and the steering feeling of the active roll stabilizer 40 (S21-8).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of adjusting friction of a motor driven power steering (MDPS) unit comprising:
    detecting road surface conditions of a road on which a vehicle travels;
    classifying the road on which the vehicle travels into a normal road, a low frictional road, a road having a first uneven road surface, and a road having a second uneven road surface; and
    varying a supporting force of an active roll stabilizer (ARS) provided in the MDPS unit depending on the detected road surface conditions,
    wherein the varying the supporting force of the active roll stabilizer comprises:
    reducing a friction of the MDPS unit of the vehicle when the road on which the vehicle travels is determined as the road having the first uneven road surface, and
    increasing the friction of the MDPS unit of the vehicle when the road on which the vehicle travels is determined as the low frictional road or the road having the uneven road surface when classifying the road on which the vehicle travels into a normal road, the low frictional road, the road having the first uneven road surface, and the road having the second uneven road surface, the increasing the friction of the MDPS unit of the vehicle further comprising:
adjusting the supporting force of the active roll stabilizer to a first preset supporting force when the road on which the vehicle travels is classified into the low frictional road without a vehicle stability management (VSM) operating signal; and
adjusting the supporting force of the active roll stabilizer to a second preset supporting force when the road on which the vehicle travels is classified into the low frictional road without the VSM operating signal.

2. The method of claim 1, in the classification of the road on which the vehicle travels into classifying the road on which the vehicle travels is classified into the normal road, the low frictional road, the road having the first uneven road surface, and the road having the second uneven road surface, further comprising:
inputting a column torque of the vehicle, an output from the MDPS unit, a steering angle, a steering angular velocity, a vehicle speed, a wheel speed, a vehicle stability management (VSM) operating signal;
determining the road as the first uneven road surface when a difference between wheel speeds of right and left tires of the vehicle is greater than a first preset uneven reference and less than a second preset uneven reference;
determining the road as the low frictional road when a value obtained by dividing the column torque by a preset torque value is less than 1 (one); and
determining the road as the normal road other else.

3. The method of claim 2 in the increasing the friction of the MDPS unit of the vehicle when the road on which the vehicle travels is determined as the low frictional road or the road having the uneven road surface when classifying the road on which the vehicle travels into the normal road, the low frictional road, the road having the first uneven road surface, and the road having the second uneven road surface, further comprising: adjusting the supporting force of the ARS to a third preset supporting force when the road on which the vehicle travels is classified into the road having the first uneven road surface; and adjusting the supporting force of the ARS to the first preset supporting force when the road on which the vehicle travels is classified into the road having the second uneven road surface frictional road.

4. The method of claim 1, in increasing the friction of the MDPS unit of the vehicle when the road on which the vehicle travels is determined as the low frictional road or the road having the uneven road surface when classifying the road on which the vehicle travels into the normal road, the low frictional road, the road having the first uneven road surface, and the road having the second uneven road surface, further comprising:
adjusting the supporting force of the active roll stabilizer (ARS) to a third preset supporting force when the road on which the vehicle travels is classified into the low frictional road without the VSM operating signal; and
adjusting the supporting force of the active roll stabilizer to the second preset supporting force when the road on which the vehicle travels is classified into the low frictional road without the VSM operating signal.

5. The method of claim 1, in increasing the friction of the MDPS unit of the vehicle when the road on which the vehicle travels is determined as the low frictional road or the road having the uneven road surface when classifying the road on which the vehicle travels into the normal road, the low frictional road, the road having the first uneven road surface, and the road having the second uneven road surface, further comprising:
adjusting the supporting force of the ARS to a third preset supporting force when the road on which the vehicle travels is classified into the road having the first uneven road surface; and
adjusting the supporting force of the ARS to the second preset supporting force when the road on which the vehicle travels is classified into the road having the second uneven road surface frictional road.

6. The method of claim 1, wherein the second preset supporting force is 45 Nm, a third preset supporting force is 30 Nm, and the first preset supporting force is 15 Nm.

7. A method of adjusting friction of a motor driven power steering (MDPS) unit comprising:
determining whether a vehicle is accelerated higher than a preset acceleration or is decelerated lower than a preset deceleration; and
increasing the friction of the MDPS unit of the vehicle when the vehicle is accelerated higher than the preset acceleration or is decelerated lower than the preset deceleration in such a way of varying a supporting force of an active roll stabilizer (ARS) provided in the MDPS unit depending on a detected road surface conditions,
wherein the varying the supporting force of the active roll stabilizer comprises:
reducing a friction of the MDPS unit of the vehicle when a road on which the vehicle travels is determined as a road having a first uneven road surface, and
increasing the friction of the MDPS unit of the vehicle when the road on which the vehicle travels is determined as a low frictional road or a road having an uneven road surface when classifying the road on which the vehicle travels into a normal road, the low frictional road, the road having a first uneven road surface, and the road having a second uneven road surface,
wherein the increasing the friction of the MDPS unit of the vehicle further includes:
adjusting the supporting force of the active roll stabilizer to a first preset supporting force when the road on which the vehicle travels is classified into the low frictional road without a vehicle stability management (VSM) operating signal; and
adjusting the supporting force of the active roll stabilizer to a second preset supporting force when the road on which the vehicle travels is classified into the low frictional road without the VSM operating signal.

8. The method of claim 7, in the increasing the friction of the MDPS unit of the vehicle when the vehicle is accelerated higher than the preset acceleration or is decelerated lower than the preset deceleration, further comprising:
adjusting the supporting force of the active roll stabilizer (ARS) of the vehicle to a first third preset supporting force.

9. An apparatus for adjusting friction of a motor driven power steering (MDPS) unit comprising:
a fail-safe determining logic unit receiving an error signal from the MDPS unit of a vehicle to output an A-level active roll stabilizer error signal and B- and C-level active roll stabilizer error signals;
an uneven road surface estimating logic unit receiving a wheel speed signal of the vehicle and a preset uneven road surface profile signal to determine whether a road surface on which the vehicle travels is a first uneven road surface or a second uneven road surface;

a vehicle stability management (VSM) operation determining logic unit receiving an activation/inactivation signal of the VSM to output a signal determining whether to activate an active roll stabilizer (ARS);

a sudden acceleration-deceleration determining logic unit receiving a vehicle speed of the vehicle to determine whether to active the ARS;

a road surface friction estimating logic unit receiving a steering angle, a steering angular velocity, and the vehicle speed of the vehicle to output a signal of determining whether the road surface on which the vehicle travels is a low frictional road or a high frictional road;

a priority determining logic unit receiving the signals outputted from the fail-safe determining logic unit, the uneven road surface estimating logic unit, the VSM operation determining logic unit, the sudden acceleration-deceleration determining logic unit, and the road surface friction estimating logic unit to determine priorities of the signals; and an ARS controller receiving the signal outputted from the priority determining logic unit to output a signal of adjusting a supporting force of the ARS of the MDPS unit, wherein, when the steering angle is greater than a first preset steering angle and less than a second preset steering angle, when the steering angular velocity of the vehicle exceeds a first preset steering angular velocity and is less than a second preset steering angular velocity, and when the vehicle speed of the vehicle is greater than a preset vehicle speed, the road surface friction estimating logic unit outputs a low frictional road determining signal when a value obtained by dividing a column torque of the vehicle by a preset torque is less than 1 (one) and a high frictional road determining signal when the value obtained by dividing the column torque of the vehicle by a preset torque is greater than 1 (one).

10. The apparatus of claim 9, wherein the fail-safe determining logic unit outputs an A-level ARS error signal when the signal received from the MDPS unit of the vehicle indicates an error of the steering angle, a low voltage of a battery, a high voltage of the battery, or an A-level error signal and a B- and C-level ARS error signals when the signal received from the MDPS unit of the vehicle indicates the B-level ARS error signal or the C-level ARS error signal.

11. The apparatus of claim 9, wherein the uneven road surface estimating logic unit receives a wheel speed signal of the vehicle and determines the road surface as the first uneven road surface when a difference between right and left wheel speeds is greater than a first preset uneven reference extracted from the uneven road surface profile signal and less than a second uneven reference, and the second uneven road surface when the difference is greater than the second uneven reference.

12. The apparatus of claim 9, wherein the VSM operation determining logic unit does not output an activating signal of the ARS when the VSM is not activated and outputs the activating signal of the ARS when the VSM is activated.

13. The apparatus of claim 9, wherein the sudden acceleration-deceleration determining logic unit receiving the vehicle speed of the vehicle to determine whether to active the ARS determines a sudden acceleration when the vehicle speed is greater than a preset acceleration and a sudden deceleration when the vehicle speed is lower than a preset deceleration and to output an ARS activating signal when the vehicle is suddenly accelerated or decelerated.

14. The apparatus of claim 9, wherein the priority determining logic unit processes signals received from the fail-safe determining logic unit, the uneven road surface estimating logic unit, the VSM operation determining unit, the sudden acceleration-deceleration determining unit, and the road surface friction estimating logic unit in the order of B- and C-level ARS error signals, an A-level ARS error signal, a first uneven road surface determining signal, a second uneven road surface determining signal, an ARS activating signal, an ARS activating signal based on a sudden acceleration-deceleration status, a low friction determining signal, and a high friction determining signal.

15. The apparatus of claim 9, wherein the ARS controller outputs:

a signal of adjusting the supporting force of the ARS to a third preset supporting force when B- and C-level ARS error signals, a low frictional road determining signal or a high frictional road determining signal are received;

a signal of adjusting the supporting force of the ARS to a first preset supporting force when an ARS activating signal based on an A-level ARS error signal, a second uneven road surface determining signal, an ARS activating signal, and an ARS activating signal based on a sudden accelerated state or a sudden decelerated state; and a signal of adjusting the supporting force of the ARS to a second preset supporting force when a first uneven road surface determining signal is received.

16. The apparatus of claim 15, wherein the first preset supporting force is 45 Nm, the second preset supporting force is 30 Nm, and the third preset supporting force is 15 Nm.

* * * * *